United States Patent [19]

Hirosaki et al.

[11] Patent Number: 5,126,294
[45] Date of Patent: Jun. 30, 1992

[54] SINTERED SILICON NITRIDE AND PRODUCTION METHOD THEREOF

[75] Inventors: Naoto Hirosaki; Akira Okada, both of Yokohama, Japan

[73] Assignee: Nissan Motor Co., Ltd., Yokohama, Japan

[21] Appl. No.: 707,995

[22] Filed: May 23, 1991

Related U.S. Application Data

[63] Continuation of Ser. No. 389,449, Aug. 4, 1989, abandoned.

[30] Foreign Application Priority Data

Aug. 9, 1988 [JP] Japan ................................. 63-199709

[51] Int. Cl.$^5$ ............................................. C04B 35/58
[52] U.S. Cl. ........................................ 501/97; 501/98
[58] Field of Search ....................................... 501/97, 98

[56] References Cited

U.S. PATENT DOCUMENTS 4,341,874  7/1982  Nishida et al. .......................... 501/97
4,716,133  12/1987  Horiuchi et al. ........................ 501/97

Primary Examiner—Mark L. Bell
Assistant Examiner—Deborah Jones
Attorney, Agent, or Firm—Pennie & Edmonds

[57] ABSTRACT

A sintered silicon nitride which comprises silicon nitride as a main component and having an oxygen content not more than 1% by weight and a bulk density not less than 95% of the theoretical density thereof. The sintered silicon nitride is produced as follows: Silicon powder and the oxide of at least one element selected from the group IIIb of a periodic table of the elements are mixed to obtain a mixture, in which the total amount of the oxide is not larger than 4% by weight of the mixture. The mixture of the silicon powder and the oxide is compacted to form a compact. The compact is nitrided in the atmosphere of nitrogen at a temperature of not higher than 1500° C. to have a silicon remaining rate ranging from 2 to 20% by weight. Then, the compact is fired in the atmosphere of nitrogen at a pressure of not less than 1 atmospheric pressure and at a temperature ranging from 1800° to 2200° C. to obtain the sintered silicon nitride having a bulk density not less than 95% of the theoretical density thereof.

5 Claims, 1 Drawing Sheet

SINTERED SILICON NITRIDE AND PRODUCTION METHOD THEREOF

This is a continuation of U.S. Pat. Ser. No. 07/389,449 filed Aug. 4, 1989, now abandoned.

BACKGROUND OF THE INVENTION

1. Field of the Invention

This invention relates to a sintered silicon nitride and a production method thereof, which sintered nitride has a high temperature strength and suitable for the material of fine ceramic structural parts which are usable throughout a wide industrial field such as automobiles, mechanical apparatuses, chemical apparatuses and aeronautical and astronautical apparatuses.

2. Description of the Prior Art

Sintered silicon nitrides whose main component is silicon nitride are chemically stable and high in mechanical strength at ordinary and high temperatures, and therefore are suitable for the material of sliding parts such as bearings and engine parts such as rotors of turbochargers. Since silicon nitride is difficult to be singly sintered, it is usually sintered upon adding a large amount of sintering assistants such as $MgO$, $Al_2O_3$ and $Y_2O_3$. Such sintering method is disclosed, for example, in Japanese Patent Provisional Publication Nos. 49-63710, 54-15916 and 60-137873.

However, in the conventional sintered silicon nitride produced by adding a large amount of the sintering assistants such as $MgO$, $Al_2O_3$ and $Y_2O_3$, there exists a glass phase having a low melting point in grain boundary in the sintered silicon nitride. Accordingly, structural parts formed of this sintered silicon nitride are low in high temperature performance such as creep resistance, high temperature strength and oxidation resistance.

SUMMARY OF THE INVENTION

It is an object of the present invention to provide an improved sintered silicon nitride which overcomes conventional problems and excellent in strength both at ordinary and high temperatures while being less in strength lowering in high temperature conditions.

Another object of the present invention is to provide an improved production method of the sintered silicon nitride which is excellent in high temperature performance such as creep resistance characteristics, high temperature strength, heat resistance and oxidation resistance.

The present invention has been envisaged upon paying attention to the fact that suppression of oxygen content in a sintered silicon nitride is effective for preventing strength lowering at high temperatures and for improving high temperature performance, which fact has been found during studies of the inventors. Accordingly, in the present invention, the added amount of oxide sintering assistants and of other oxygen sources is minimized to decrease the oxygen amount in the resultant sintered silicon nitride. In this connection, lowering in sinterability due to the minimized oxygen content in starting materials is compensated by controlling sintering conditions, carrying out the firing so that the bulk density of the resultant sintered silicon nitride reaches a value of not less than 95% of the theoretical density thereof.

Thus, an aspect of the present invention resides in a sintered silicon nitride which is comprised of silicon nitride as a main component and contains oxygen in an amount of not more than 1% by weight. Additionally, the bulk density of the sintered silicon nitride is not less than 95% of the theoretical density thereof.

Another aspect of the present invention resides in a production method of the sintered silicon nitride which method comprises in the sequence set forth below: Silicon power and oxide of at least one element selected from the group IIIb of a periodic table of the elements are mixed to obtain a mixture, in which the total amount of the oxide is not larger than 4% by weight of the mixture. The mixture of the silicon powder and the oxide is compacted to form a compact. The compact is nitrided in the atmosphere of nitrogen at a temperature of not higher than 1500° C. to have a silicon remaining rate ranging from 2 to 20% by weight. Then, the compact is fired in the atmosphere of nitrogen at a pressure of not lower than 1 atmospheric pressure at a temperature ranging from 1800° to 2200° C. to obtain the sintered silicon nitride having a bulk density not less than 95% of the theoretical density thereof.

Thus, the sintered silicon nitride obtained according to the present invention is less in oxygen content and has a fine and rigid structure. Consequently, the sintered silicon nitride is not only excellent in strength in ordinary temperature conditions but also less in strength lowering in high temperature conditions. Therefore, the sintered silicon nitride of the present invention serves as a fine ceramic material which is excellent in high temperature performance such as creep resistance characteristics, high temperature strength, heat resistance and oxidation resistance, and therefore is suitable for the material of a variety of structural parts which are used in high temperature conditions while greatly contributing to decreasing weight of the structural parts.

BRIEF DESCRIPTION OF THE DRAWINGS

The single FIGURE (FIG. 1) is a graph showing a nitriding schedule employed in Examples and some Comparative Examples.

DETAILED DESCRIPTION OF THE INVENTION

Figure 1:
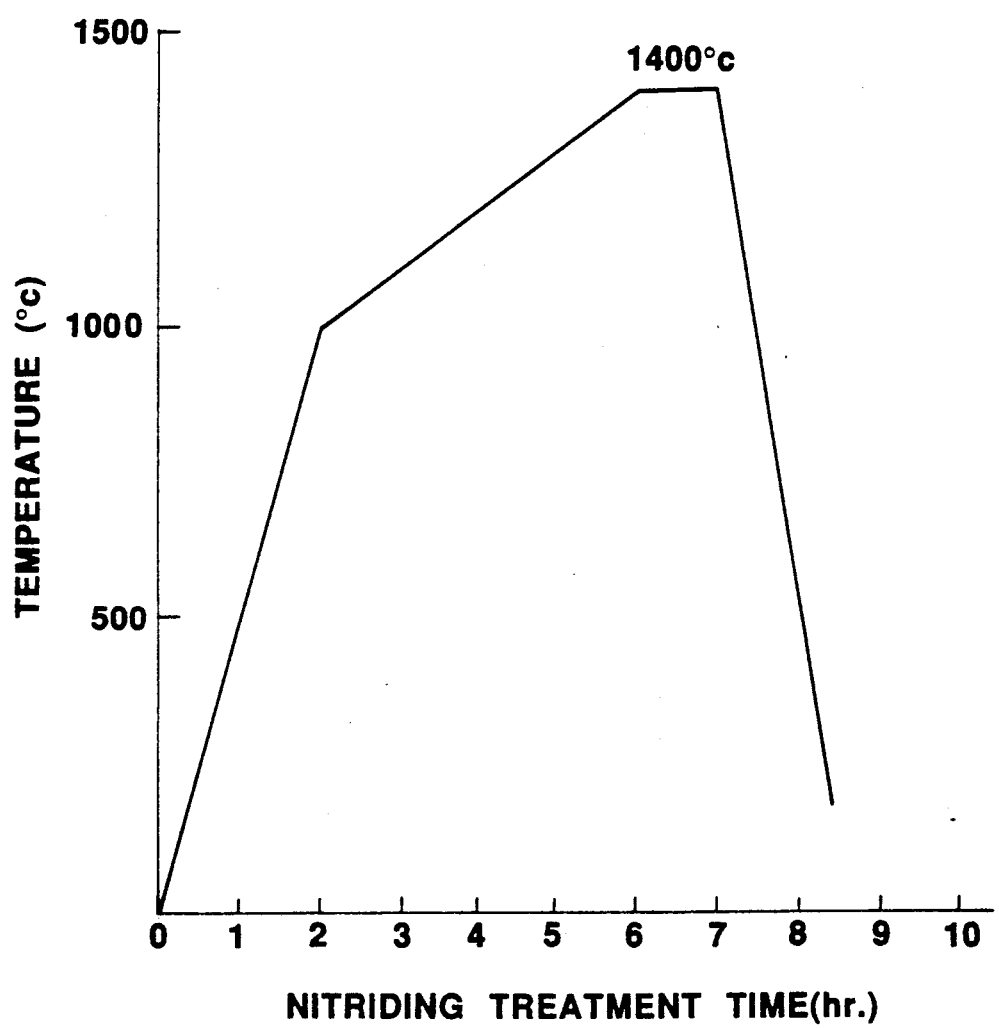

According to the present invention, a sintered silicon nitride is comprised of a main component which is silicon nitride. The sintered silicon nitride contains oxygen in an amount of not more than 1% by weight and has a bulk density not less than 95% of the theoretical density thereof. This sintered silicon nitride is produced as follows: First, silicon nitride powder and the oxide of at least one element selected from the group IIIb of a periodic table of the elements are mixed to obtain a mixture, in which the total amount of the oxide is not more than 4% by weight of the mixture. Then, the mixture of the silicon powder and the oxide is compacted to form a compact. The compact is nitrided in the atmosphere of nitrogen at a temperature of not higher than 1500° C. as to have a silicon remaining rate ranging from 2 to 20% by weight. Finally, the compact is fired in the atmosphere of nitrogen at not less than 1 atmospheric pressure and at a temperature ranging from 1800° to 2200° C. to obtain the sintered silicon nitride having a bulk density not less than 95% of the theoretical density thereof.

Existence of oxygen in the sintered silicon nitride is due to impurity silica ($SiO_2$) contained in the silicon powder as a starting material (raw material) and to oxide sintering assistants. As a result of a variety of studies made to improve high temperature performance upon paying attention to oxygen content in sintered silicon nitride, it has been confirmed that the sintered silicon nitride which is excellent in high temperature performance such as creep resistance characteristics, high temperature strength, temperature resistance and oxidation resistance can be obtained by suppressing oxygen content in the sintered silicon nitride at a value of not more that 1% by weight of the sintered silicon nitride and by setting the bulk density of the sintered silicon nitride at a value of not less than 95% of the theoretical density thereof.

Additionally, it is preferable from the point of view of a further improvement in the high temperature characteristics, that the sintered silicon nitride contains elements other than Si, N, sintering assistant elements (for example, elements of the group IIIb in a periodic table of the elements) in a total amount not more than 0.5% by weight of the sintered silicon nitride. It will be understood that the sintered silicon nitride may contain materials (such as silicon carbide and whiskers) which do not react with the silicon nitride in an amount over 0.5% by weight of the sintered silicon nitride.

In producing the sintered silicon nitride of the present invention, no special conditions are required for the starting materials (raw materials), the sintering assistant, mixing manner, compacting and sintering. However, the following production method is preferable: First, silicon powder and oxide of at least one element selected from the group IIIb of a periodic table of the elements are mixed to obtain a mixture, in which the total amount of the oxide is not larger than 4% by weight of the mixture. The thus obtained mixture of the silicon powder and the oxide is compacted to form a compact. Then the compact is nitrided in the atmosphere of nitrogen at a temperature not higher than 1500° C. to have a silicon remaining rate ranging from 2 to 20% by weight. Thereafter, the compact is fired in the atmosphere of nitrogen at a pressure of not less than 1 atmospheric pressure and at a temperature ranging from 1800° to 2200° C. to obtain a sintered silicon nitride having a bulk density not less than 95% of the theoretical density thereof.

In the above production method, the starting materials are silicon powder and the oxides of elements selected from the group IIIb of a periodic table of the elements. It is preferable that the oxygen content in the silicon powder as the starting material is less. However, the oxygen content in the silicon powder may not be limited to a smaller value because a part of oxygen originally contained in silicon powder will dissipate as oxide of silicon during nitriding and firing which are carried out later. It is more preferable that the oxygen content is not more than 4% by weight of the silicon powder. Examples of the elements of the group IIIb of a periodic table constituting the oxides are Sc, Y, Lanthanides (having atomic numbers of from 57 to 71), Actinides (having atomic numbers of from 89 to 103) and the like. Of these elements, Y, La, Nd, Sm and the like are usually used from the view points of availability and treating ability. The total added amount of the oxide of at least one element selected from the group IIIb of the periodic table to the silicon powder is not more than 4% by weight of the mixture in order that the oxygen content in the sintered silicon nitride is not more than 1% by weight thereby to suppress lowering in high temperature performance of the sintered silicon nitride.

Thus, a mixture composition of the silicon powder as the starting material and the oxide is determined so that the oxygen content of the resultant sintered silicon nitride becomes not more than 1% by weight. Preferably the starting material contains elements other than Si, elements of the group IIIb of the periodic table, O and N in an amount of not more than 0.5% by weight. However, the starting material may contains the materials (such as silicon carbide and whiskers) which do not react with silicon nitride, in an amount over 0.5% by weight as mentioned above.

Then, the mixture of the starting materials is compacted to obtain a compact. In order to compact the mixture of the silicon powder and the oxides of the elements of the group IIIb of the periodic table, one of usual compacting methods for ceramic powder is selected according to shapes and the like of a product to be manufactured and therefore no special method is required in carrying out the present invention. In this connection, the usual compacting methods include metallic mold press compacting, rubber press compacting and injection molding compacting.

Subsequently, the compact of the mixture is subjected to a nitriding treatment in the atmosphere of nitrogen at a temperature not higher than 1500° C. so that the silicon remaining rate is 2 to 20% by weight. During this nitriding treatment, silicon and nitrogen react with each other to produce silicon nitride. In order to further decrease the oxygen content, it is preferable that nitriding is not completely carried out so that silicon remains in the nitrided compact, in which the silicon remaining rate (weight percent of silicon remaining in the nitrided compact) is within a range from 2 to 20% by weight. If the silicon remaining rate is ,less than 2% by weight, oxygen content decreasing effect is much less. The silicon remaining rate exceeding 20% by weight is not desirable so that the remaining silicon melts during the next firing process. When the nitrided compact containing a suitable amount of the remaining silicon is fired during the next firing or sintering process, SiO evaporates under a reaction represented by the following chemical equation so that the oxygen content in the sintered silicon nitride decreases:

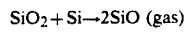

$$SiO_2 + Si \rightarrow 2SiO \text{ (gas)}$$

In the firing or sintering process to obtain the sintered silicon nitride, firing is carried out in the atmosphere of nitrogen at a pressure of not lower than 1 atmospheric pressure and at a temperature ranging from 1800° to 2200° C. so that the bulk density of the sintered silicon nitride reaches a value of not less than 95% of the theoretical density of the same sintered silicon nitride. If the pressure is lower than 1 atmospheric pressure, decomposition of silicon nitride becomes remarkable, so that the sintered silicon nitride having a fine structure cannot be obtained. An atmospheric pressure required for suppressing such decomposition depends on firing temperature, in which a higher pressure is required as the temperature rises. Besides, if the firing temperature is lower than 1800° C., a sufficient amount of liquid phase cannot be produced and therefore a sufficient fine structure of the sintered silicon nitride cannot be obtained. If the firing temperature is higher than 2200° C., growth of grain becomes remarkable and therefore the strength of the sintered silicon nitride is lowered. Such firing is being carried out until the sintered silicon nitride having a fine structure can be obtained so that the bulk density of the sintered silicon nitride is 95% of the theoretical density of the same sintered silicon nitride.

The bulk density ($D_b$) of the sintered silicon nitride is determined by the following equation (1):

$$\text{Bulk density } (D_b) = A/V \quad (1)$$

where A is the weight of the sintered silicon nitride in air; and V is the volume of the sintered silicon nitride and given by the following equation (2):

$$\text{Volume } (V) = \frac{A - B}{C} \quad (2)$$

where B is the weight of the sintered silicon nitride in water; and C is the density of water.

The theoretical density ($D_t$) of the sintered silicon nitride is determined by the following equation (3):

$$\text{Theoretical density } (D_t) = \frac{T_w}{T_v} \quad (3)$$

where $T_w$ is the total weight of starting materials (such as $Si_3N_4$, $Y_2O_3$, $Nd_2O_3$ and the like); and $T_v$ is the total theoretical volume of the starting materials, the theoretical volume ($v_t$) of each starting material being given by the following equation (4):

$$\text{Theoretical volume } (v_t) = \frac{w}{g_s} \quad (4)$$

where w is the weight of the starting material; and $g_s$ is the specific gravity of the starting material.

It has been confirmed that sintered silicon nitride obtained as a result of the above-discussed production method has an oxygen content of not more than 1% by weight and a bulk density which is 95% of the theoretical density, and is excellent in high temperature performance such as creep resistance characteristics, high temperature strength, heat resistance and oxidation resistance.

In order to evaluate the sintered silicon nitride of the present invention, Examples 1 to 5 according to the present invention will be discussed hereinafter in comparison with Comparative Examples 1 to 4 which are not within the scope of the present invention.

EXAMPLE 1

Yttrium oxide ($Y_2O_3$) in an amount of 1.6% by weight and neodymium oxide ($Nd_2O_3$) in an amount of 1.6% by weight were added into silicon powder having an average particle size of 20 micrometer ($\mu$m) and an oxygen content of 0.5% by weight. The three components were then well mixed in ethanol for 24 hours by using a ball mill thereby to obtain a mixture. After drying, the mixture was compacted at a pressure of 20 MPa by using a metallic die and thereafter compacted at a pressure of 200 MPa by means of a rubber press thereby to obtain a compact having the dimension of 6 mm×6 mm×50 mm.

Subsequently, the compact was subjected to a nitriding treatment according to a nitriding treatment schedule shown in FIG. 1, in which the compact was heated in the atmosphere of nitrogen at 1 atmospheric pressure thereby to obtain a nitrided compact or a silicon nitride having a density of 2.45 g/cm³. The silicon remaining rate of this nitrided compact was 5.0% by weight.

Next, the nitrided compact was fired at 2000° C. for 4 hours in the atmosphere of nitrogen at a pressure of 100 atmospheric pressure thereby to obtain a sintered compact or silicon nitride. The sintered silicon nitride had a composition shown in Table 2 and a bulk density of 3.18 g/cm³ which was 98.5% by weight of the theoretical density of 3.23 g/cm³. The oxygen content of the sintered silicon nitride was 0.80% by weight.

The thus obtained sintered silicon nitride was machined and ground into a shape having a dimension of 3 mm×4 mm×40 mm by using a diamond wheel, and subjected to a three point bending test (span: 30 mm) at room temperature and at a temperature of 1400° C. The bending test was conducted on five specimens of the sintered silicon nitride to obtain an average value of the five measured values. As a result, the average value was 680 MPa at room temperature and 640 MPa at 1400° C. This proved that the resultant sintered silicon nitride was not lowered in strength and therefore excellent in high temperature characteristics. The data of the Example 1 are shown in Tables 1 and 2.

COMPARATIVE EXAMPLE 1

Yttrium oxide ($Y_2O_3$) in an amount of 1.0% by weight and neodymium oxide ($Nd_2O_3$) in an amount of 1.0% by weight were added into silicon nitride powder having an average particle size of 1 micrometer (um) and an oxygen content of 1.5% by weight. The three components were then well mixed in ethanol for 24 hours by using a ball mill thereby to obtain a mixture. After drying, the mixture was compacted at a pressure of 20 MPa by using a metallic die and thereafter compacted at a pressure of 200 MPa by means of a rubber press thereby to obtain a compact having the dimension of 6 mm×6 mm×50 mm.

Subsequently, the compact was fired at 2000° C. for 4 hours in the atmosphere of nitrogen at a pressure of 100 atmospheric pressure thereby to obtain a sintered compact or silicon nitride. The sintered silicon nitride had a composition shown in Table 2 and a bulk density of 3.12 g/cm³ which is 96.9% of the theoretical density (3.22 g/cm³). The oxygen content of the sintered silicon nitride was 1.68% by weight.

The thus obtained sintered silicon nitride was machined and ground into a shape having a dimension of 3 mm×4 mm×40 mm by using a diamond wheel, and subjected to a three point bending test (span: 30 mm) at room temperature and at a temperature of 1400° C. The bending test was conducted on five specimens of the sintered silicon nitride to obtain an average value of the five measured values. As a result, the average value was 550 MPa at room temperature and 230 MPa at 1400° C. This proved that the resultant sintered silicon nitride was sharply lowered in strength in high temperature conditions. The data of the Comparative Example 1 are shown in Tables 1 and 2.

EXAMPLES 2, 3, 4 and 5

Oxide sintering assistants shown in each of columns of Examples 2, 3, 4 and 5 in Table 1 were added into silicon powder having an average particle size of 20 micrometer ($\mu$m) and an oxygen content of 0.5% by weight. The plural components were then well mixed in ethanol for 24 hours by using a ball mill thereby to obtain a mixture. After drying, the mixture was compacted at a pressure of 20 MPa by using a metallic die and thereafter compacted at a pressure of 200 MPa by means of a rubber press thereby to obtain a compact having the dimension of 6 mm×6 mm×50 mm.

Subsequently, the compact was subjected to a nitriding treatment according to a nitriding treatment schedule shown in FIG. 1, in which the compact was heated in the atmosphere of nitrogen at 1 atmospheric pressure thereby to obtain a nitrided compact or silicon nitride. The silicon remaining rate of each nitrided compact was shown in each of columns of Examples 2, 3, 4 and 5 in Table 1.

Next, each nitrided compact was fired at 1900° C. for 4 hours in the atmosphere of nitrogen at a pressure of 50 atmospheric pressures thereby to obtain a sintered compact or silicon nitride. Each sintered silicon nitride had a composition and a ratio of the bulk density to the theoretical density as shown in each of the columns of the Examples 2, 3, 4 and 5 of Table 2, in which each sintered silicon nitride has a fine structure having a bulk density-theoretical density ratio not less than 95%. The oxygen content of each sintered silicon nitride was not more than 1.0% by weight as shown in each of the columns of the Examples 2, 3, 4 and 5 in Table 2.

The thus obtained each sintered silicon nitride was machined and grinded into a shape having a dimension of 3 mm×4 mm×40 mm by using a diamond wheel, and subjected to a three point bending test (span: 30 mm) at room temperature and at a temperature of 1400° C. The bending test was conducted on five specimens for each sintered silicon nitride to obtain an average value of the five measured values. As a result, as shown in each of the columns of the Examples 2, 3, 4 and 5 in Table 2, it was proved that the resultant respective sintered silicon nitrides were not only high in strength in loom temperature but also prevented from lowering in strength in high temperature conditions and therefore excellent in high temperature performance.

COMPARATIVE EXAMPLES 2, 3 and 4

Oxide sintering assistants shown in each of columns of Comparative Examples 2, 3 and 4 in Table 1 were added into silicon powder having an average particle size of 20 micrometer (μm) and an oxygen content of 0.5% by weight. The plural components were then well mixed in ethanol for 24 hours by using a ball mill thereby to obtain a mixture. After drying, the mixture was compacted at a pressure of 20 MPa by using a metallic die and thereafter compacted at a pressure of 200 MPa by means of a rubber press thereby to obtain a compact having the dimension of 6 mm×6 mm×50 mm.

Subsequently, the compact was subjected to a nitriding treatment according to a nitriding treatment schedule shown in FIG. 1, in which the compact was heated in the atmosphere of nitrogen at 1 atmospheric pressure thereby to obtain a nitrided compact or silicon nitride. The silicon remaining rates of the respective nitrided compacts were shown in the columns of Comparative Examples 2, 3 and 4 in Table 1.

Next, each nitrided compact was fired at 1900° C. for 4 hours in the atmosphere of nitrogen at 50 atmospheric pressures thereby to obtain a sintered compact or silicon nitride. Each sintered silicon nitride had a composition and a ratio of the bulk density to the theoretical density as shown in each of the columns of the Comparative Examples 2, 3 and 4 of Table 2, in which all the sintered silicon nitrides have a fine structure. The oxygen content of each sintered silicon nitride exceeded over 1.0% by weight as shown in each of the columns of the Comparative Examples 2, 3 and 4 in Table 2.

The thus obtained each sintered silicon nitride was machined and ground into a shape having a dimension of 3 mm×4 mm×40 mm by using a diamond wheel, and subjected to a three point bending test (span: 30 mm) at room temperature and at a temperature of 1400° C. The bending test was conducted on five specimens for each sintered silicon nitride to obtain an average value of the five measured values. As a result, as shown in each of the columns of the Comparative Examples in Table 2, it was proved that although the respective resultant silicon nitrides were high in strength at loom temperature, they were sharply lowered in strength in a high temperature condition because of higher oxygen contents in the sintered silicon nitrides. This strength lowering tendency was particularly remarkable in the Comparative Example 4 using $Al_2O_3$ which was an oxide of element other than of the group IIIb of a periodic table of the elements.

TABLE 1

| Sample | Composition of starting materials (wt %) | | | | | | | | Silicon remaining rate in nitrided compact (wt %) |
| --- | --- | --- | --- | --- | --- | --- | --- | --- | --- |
| | Si | $Si_3N_4$ | $Y_2O_3$ | $Nd_2O_3$ | $La_2O_3$ | $Sm_2O_3$ | $Dy_2O_3$ | $Al_2O_3$ | |
| Example 1 | 96.8 | — | 1.6 | 1.6 | — | — | — | — | 5.0 |
| Example 2 | 97.5 | — | 0.8 | — | — | 1.7 | — | — | 4.5 |
| Example 3 | 97.5 | — | 1.7 | 0.8 | — | — | — | — | 6.2 |
| Example 4 | 97.5 | — | 0.8 | 1.7 | — | — | — | — | 5.9 |
| Example 5 | 97.5 | — | 0.8 | — | — | — | 1.7 | — | 5.0 |
| Comparative Example 1 | — | 98.0 | 1.0 | 1.0 | — | — | — | — | — |
| Comparative Example 2 | 90.4 | — | 4.8 | — | 4.8 | — | — | — | 4.1 |
| Comparative Example 3 | 87.3 | — | 12.7 | — | — | — | — | — | 3.6 |
| Comparative Example 4 | 77.2 | — | 15.2 | — | — | — | — | 7.6 | 2.8 |

TABLE 2

| Sample | Composition of sintered silicon nitride (wt %) | | | | | | | Ratio of bulk density to theoretical density (%) | Oxygen content in sintered silicon nitride (wt/%) | Strength (MPa) | |
| --- | --- | --- | --- | --- | --- | --- | --- | --- | --- | --- | --- |
| | $Si_3N_4$ | $Y_2O_3$ | $Nd_2O_3$ | $La_2O_3$ | $Sm_2O_3$ | $Dy_2O_3$ | $Al_2O_3$ | | | Room temp. | 1400° C. |
| Example 1 | 98.0 | 1.0 | 1.0 | — | — | — | — | 98.5 | 0.80 | 680 | 650 |

TABLE 2-continued

| Sample | Composition of sintered silicon nitride (wt %) | | | | | | | Ratio of bulk density to theoretical density (%) | Oxygen content in sintered silicon nitride (wt/%) | Strength (MPa) | |
|---|---|---|---|---|---|---|---|---|---|---|---|
| | $Si_3N_4$ | $Y_2O_3$ | $Nd_2O_3$ | $La_2O_3$ | $Sm_2O_3$ | $Dy_2O_3$ | $Al_2O_3$ | | | Room temp. | 1400° C. |
| Example 2 | 98.5 | 0.5 | — | — | 1.0 | — | — | 96.2 | 0.75 | 720 | 620 |
| Example 3 | 98.5 | 1.0 | 0.5 | — | — | — | — | 95.8 | 0.85 | 620 | 560 |
| Example 4 | 98.5 | 0.5 | 1.0 | — | — | — | — | 98.5 | 0.77 | 740 | 570 |
| Example 5 | 98.5 | 0.5 | — | — | — | 1.0 | — | 98.2 | 0.90 | 690 | 530 |
| Comparative Example 1 | 98.0 | 1.0 | 1.0 | — | — | — | — | 96.9 | 1.68 | 550 | 230 |
| Comparative Example 2 | 94.0 | 3.0 | — | 3.0 | — | — | — | 98.9 | 2.00 | 850 | 350 |
| Comparative Example 3 | 92.0 | 8.0 | — | — | — | — | — | 97.9 | 3.70 | 740 | 370 |
| Comparative Example 4 | 85.0 | 10.0 | — | — | — | — | 5.0 | 96.1 | 5.50 | 720 | 150 |

What is claimed is:

1. A sintered silicon nitride, comprising a silicon nitride as a main component and oxygen content of not more than 1% by weight, and the bulk density of the sintered silicon nitride not being less than 95% of the theoretical density of said sintered silicon nitride, being produced by:
   mixing silicon powder and oxide of at least one element selected from the group IIIb of the periodic table of the elements to obtain a mixture, total amount of said oxide being not larger than 4% by weight of said sintered silicon nitride;
   compacting the mixture of said silicon powder and said oxide to form a compact;
   nitriding said compact in atmosphere of nitrogen at a temperature of not higher than 1500° C. for a time sufficient to reduce the silicon to 2 to 20% by weight; and
   firing said nitride compact in atmosphere of nitrogen at a pressure of not less than 1 atmospheric pressure and at temperature ranging from 1800° to 2200° C. for a time sufficient to obtain said sintered silicon nitride having a bulk density not less than 95% of a theoretical density of said sintered silicon nitride.

2. A sintered silicon nitride, comprising a silicon nitride as a main component and oxygen content of not more than 1% by weight, and the bulk density of the sintered silicon nitride not being less than 95% of the theoretical density of said sintered silicon nitride, being produced by:
   mixing silicon powder and oxide of at least one element selected from the group IIIb of the periodic table of the elements to obtain a mixture, total amount of said oxide being not larger than 4% by weight of said sintered silicon nitride;
   compacting the mixture of said silicon powder and said oxide to form a compact;
   nitriding said compact in atmosphere of nitrogen at a temperature of not higher than 1500° C. and for a time sufficient to reduce the silicon to 2 to 20% by weight; and
   firing said nitrided compact in atmosphere of nitrogen at a pressure of not less than 1 atmospheric pressure and at a temperature ranging from 1800° to 2200° C. for a time sufficient to obtain said sintered silicon nitride having a bulk density not less than 95% of a theoretical density of said sintered silicon nitride,
   wherein said firing of said nitride compact reduces the oxygen content of said nitrided compact under a reaction represented by $SiO_2 + Si \rightarrow 2SiO$ (gas) and the firing time is sufficient to compensate for the loss of sinterability said nitrided compact due to the reduced oxygen content.

3. A sintered silicon nitride, comprising a silicon nitride as a main component and oxygen content of not more than 1% by weight, and the bulk density of the sintered silicon nitride not being less than 95% of the theoretical density of said sintered silicon nitride, being produced by:
   mixing silicon powder which has an average particle size 20 micrometer (μm) and an oxygen content of 0.5% by weight and oxide of at least one element selected from the group IIIb of the periodic table of the elements to obtain a mixture, total amount of said oxide being not larger than 4% by weight of said sintered silicon nitride, said silicon and nitride being mixed in ethanol for 24 hours by using a ball mill and then after being dried;
   compacting the mixture of said silicon powder and said oxide at a pressure of 20 MPa by using a metallic die and thereafter compacted at a pressure of 200 MPa by means of a rubber press to form a compact;
   nitriding said compact in atmosphere of nitrogen at a temperature of not higher than 1500° C. and for a time sufficient to reduce the silicon to 2 to 20% by weight; and
   firing said nitrided compact in atmosphere of nitrogen at a pressure ranging from 50 to 100 atmospheric pressure and at a temperature ranging from 1800° to 2200° C. and for a time sufficient to obtain said sintered silicon nitride having a bulk density not less than 95% of a theoretical density of said sintered silicon nitride.

4. A sintered silicon nitride according to claim 1, wherein said oxide is of at least one element selected from the group consisting of Sc, Y, elements of lanthanides, and elements of actinides.

5. A sintered silicon nitride according to claim 1, wherein said oxide is of at least one element selected form the group consisting of Y, La, Nd and Sm.

* * * * *

UNITED STATES PATENT AND TRADEMARK OFFICE
CERTIFICATE OF CORRECTION

PATENT NO. : 5,126,294
DATED : June 30, 1992
INVENTOR(S) : Akiro Okada It is certified that error appears in the above-identified patent and that said Letters Patent is hereby corrected as shown below:

Column 9, claim 2, line 57, after "1500 C.", delete --and--;

Column 10, claim 3, line 47, after "1500 C.", delete --and--;

Signed and Sealed this

Sixteenth Day of November, 1993

Attest:

BRUCE LEHMAN

*Attesting Officer*     *Commissioner of Patents and Trademarks*